United States Patent [19]

Kessel

[11] 3,853,299
[45] Dec. 10, 1974

[54] APPARATUS FOR PRODUCING TUBING, ESPECIALLY FROM MATERIAL SUITABLE FOR INJECTION MOLDING

[76] Inventor: Bernhardt Kessel, Ingolstaedter Str. 20, 8073 Koeschling, Germany

[22] Filed: Sept. 25, 1972

[21] Appl. No.: 292,147

[30] Foreign Application Priority Data
Sept. 25, 1971 Germany............................ 2147922

[52] U.S. Cl.............. 249/178, 425/DIG. 5, 249/184
[51] Int. Cl............................................... B28b 7/30
[58] Field of Search ...... 425/438, 441, DIG. 5, 393; 249/66, 175, 178, 184

[56] References Cited
UNITED STATES PATENTS

| 3,049,759 | 8/1962 | Eberhardt............................ 425/438 |
| 3,279,739 | 10/1966 | Long................................ 249/184 X |
| 3,283,374 | 11/1966 | Peras ............................... 249/180 X |
| 3,339,242 | 9/1967 | Lamb.................................. 249/180 |
| 3,373,460 | 3/1968 | Ladney, Jr....................... 249/180 X |
| 3,655,323 | 4/1972 | Hall .................................... 425/438 |

FOREIGN PATENTS OR APPLICATIONS
1,344,185  10/1963  France

Primary Examiner—Richard B. Lazarus
Attorney, Agent, or Firm—Wolfgang G. Fasse

[57] ABSTRACT

The present process and apparatus relates to the production of tubing by injection molding techniques whereby the walls of the tubing is provided with outwardly extending strengthening corrugations by means of a forming or molding ring comprising a plurality of large and small segments which are radially displaceable. The flanks of these large and small segments are interengaged with each other along guide means which enforce a positive guiding of the large and small segments for their simultaneous radial displacement. Drive means for the movement of the segments are operatively connected to the small segments, whereby a drive force is applied only to the small segments prior to the withdrawal of the member which defines the inner diameter of the respective tubing.

10 Claims, 4 Drawing Figures

APPARATUS FOR PRODUCING TUBING, ESPECIALLY FROM MATERIAL SUITABLE FOR INJECTION MOLDING

BACKGROUND OF THE INVENTION

The present invention relates to a process and apparatus for producing of tubing from materials suitable for injection molding. Such tubings are provided with outwardly extending corrugations which are formed simultaneously with the injection molding steps by means of a molding or forming ring which is subdivided into alternate large and small radially displaceable individual segments. These segments are displaced radially inwardly relative to the axis of the injection molding apparatus after the injection molding step has been completed.

It is frequently necessary to provide tubings with corrugations which extend radially outwardly around the wall of the tubing, for example, for interconnecting tubing sections or for other purposes. In connection with the production of metal tubing, no problems arise because apparatus is available to those skilled in the art by means of which the corrugations may simply be rolled into the metal tubing. However, in connection with tubing made of plastics material, this is not easily possible because tubing of plastics material requires to be reheated for the formation of such corrugations, whereby costly time and energy must be expended and further working steps for the production of the corrugations cannot be avoided.

OBJECTS OF THE INVENTION

In view of the foregoing, it is the aim of the invention to achieve the following objects singly or in combination:

to provide a method and apparatus capable of producing of corrugated tubing of plastics material whereby the corrugations are to extend radially from the inside out and whereby the corrugations are to be produced simultaneously with the production of the tubing itself;

the apparatus for performing the present method is to be of simple construction to assure its proper function with a high degree of certainty;

the present apparatus is to be economical and a premature breakdown due to undue wear and tear is to be avoided;

the operation of the apparatus shall be rather simple; and the apparatus shall be adjustable as quickly as possible to the production of tubings having different dimensions and/or to the production of tubings having corrugations with differing dimensions and/or cross sections or shapes.

SUMMARY OF THE INVENTION

According to the invention there is provided an apparatus for the production of tubing having radially outwardly extending corrugations, whereby the production of the corrugations and the tubing proper takes place simultaneously by means of large and small segments which are provided along their flanks facing each other with positively effective guide means which permit a simultaneous, radial adjustment of all segments even before a member which defines the inner diameter of the tubing is pulled back into the injection molding apparatus for releasing the tubing, whereby the driving force for the radial movement of the segments is applied solely to the small segments by drive means extending slanted or at an angle relative to the axis of the injection molding apparatus.

The teaching according to the invention assures a positive opening and closing of the segments to form the respective molding circle, whereby wedging and locking effects and thus loss of time and rejects are avoided. Further, the positive guiding means employed according to the invention for the movement of the segments assures a rapid adjustment so that production figures may be increased. Another advantage of the invention is seen in that properly molded rigid tubings may be produced.

Furthermore, in order to positively retain the segments in their adjusted position in which they form a closed molding ring which does not change its shape even under the occurring work forces, the invention provides locking means for positively locking the segments after they have reached their outer ring position under the positive drive and guiding of respective drive and guide means.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
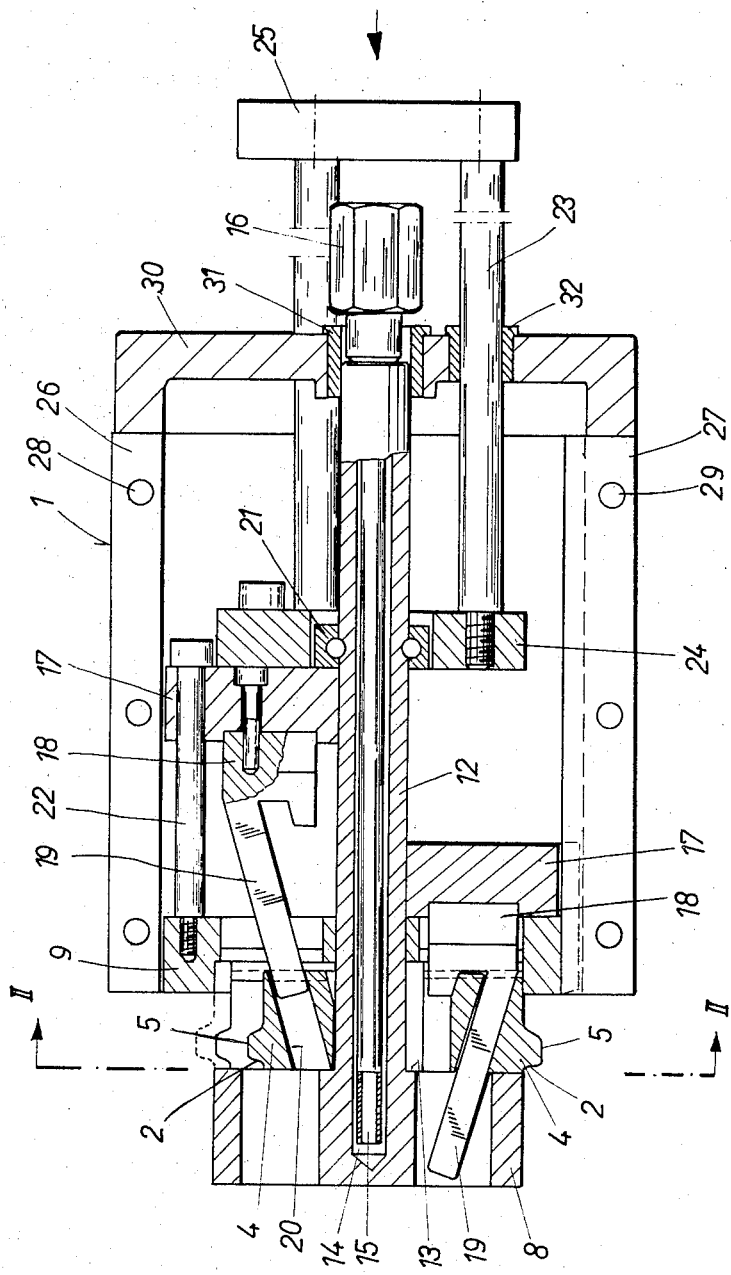
FIG. 1 is a sectional view through the apparatus according to the invention along the section line I—I in FIG. 2.
Figure 2:
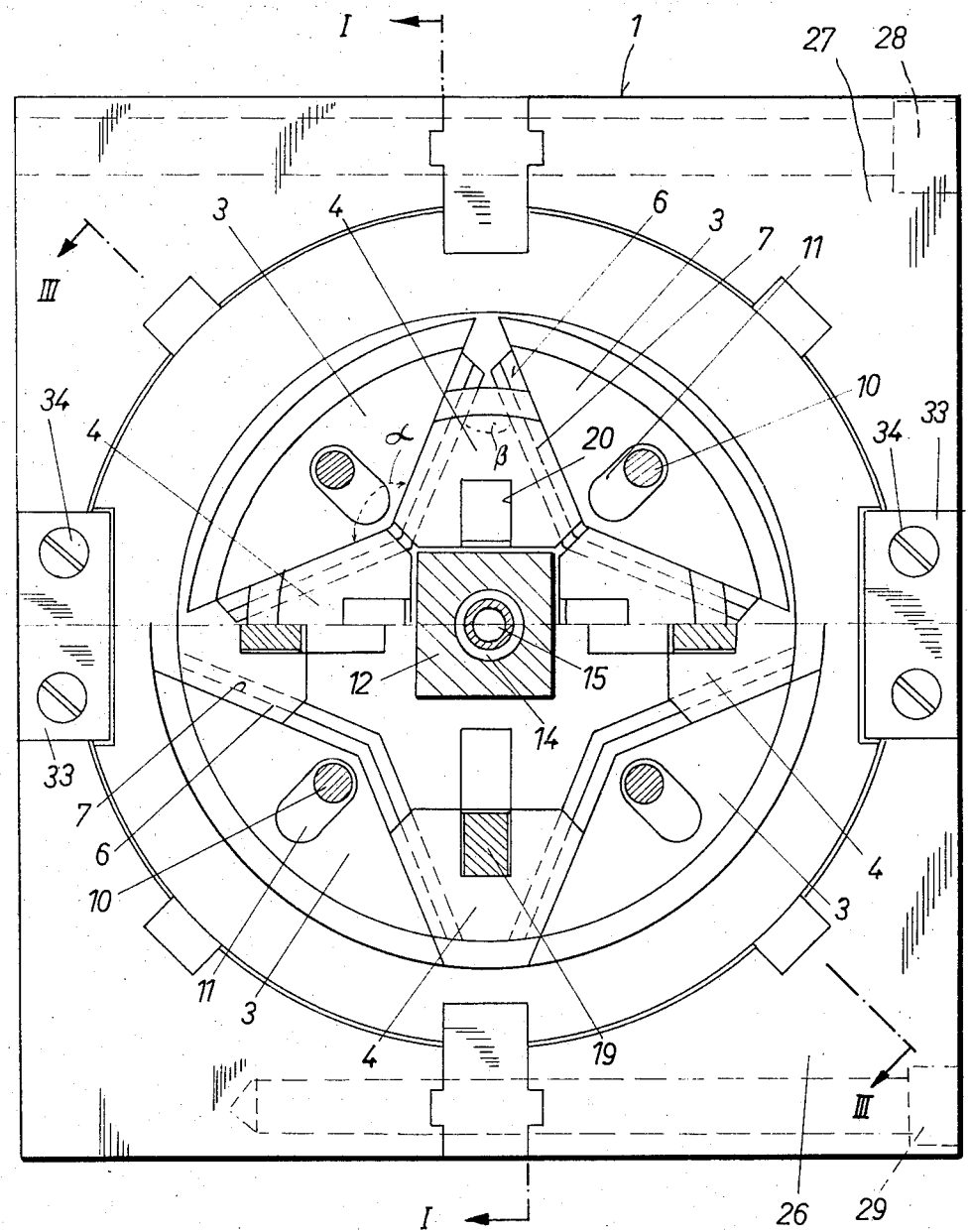
FIG. 2 is a sectional view along the section line II—II in FIG. 1.

As especially shown in FIGS. 1 and 2 the apparatus 1 according to the invention comprises a form or molding ring 2 which in turn comprises four large segments 3 and four small segment 4. Each of the segments 3 and 4 is provided at its peripheral end with a bead section 5 which has a shape corresponding to the desired shape of the corrugation. The bead sections together form a circular uninterrupted forming ring by means of which the corrugation extending around the tubing is formed.

Referring specifically to FIG. 2, it will be noted that the lower half of FIG. 2 illustrates that the segments 3 and 4 are in their radially outwardly extending position to form a half ring of the bead 5. Contrary thereto the upper half of FIG. 2 shows that the bead sections 5 of the upper segments 3 and 4 are in their withdrawn position so that the bead section 5 of the upper smaller segment 4 is displaced relative to the bead sections of the upper large segments. Specifically, it is to be noted that the longitudinal apertures 11 of the upper large segments 3 rest with their outer ends against screw bolts 10 whereas the inner ends of the respective longitudinal apertures 11 of the large lower segments rest against respective bolts 10 as best seen in FIG. 2.

The radially inwardly and outwardly extending displacement of the segments 3 and 4 is accomplished according to the invention due to the fact that the flanks 6 and 7 of the segments which face each other along these flanks are provided with hook shaped back tapers interengaging each other in such a manner that upon moving the smaller wedge shaped segments 4 radially inwardly, these smaller segments positively entrain the larger segments 3 whereby the latter are also pulled inwardly.

In any event, the angle $\beta$ which is formed between the flanks 7 of the smaller wedge shaped segments 4 is substantially smaller than the respective angle $\alpha$ which is formed between the flanks 6 of the larger segments 3.

The segments 3 and 4 are arranged between two disks 8 and 9 to provide axial guide means for the segments 3 and 4. These disks 8 and 9 are rigidly connected to each other by means of collar screws 10 especially visible in FIGS. 2 and 3. These collar screws 10 extend as mentioned above through said elongated apertures 11 in the segments 3. The apertures 11 extend radially relative to the longitudinal axis of the apparatus or tubing to be formed whereby the segments 3 are movable radially inwardly and outwardly to the extent of the play provided by the length of these elongated apertures 11.

Figure 3:
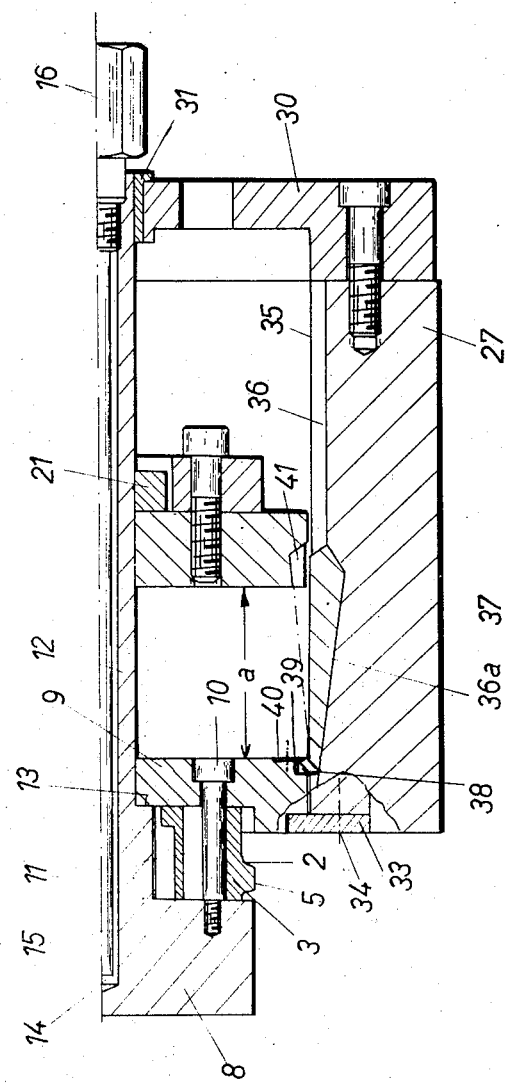
FIG. 3 is a sectional view along the line III—III in FIG. 2 whereby for simplicity's sake only one half of the whole section is shown.
Figure 4:
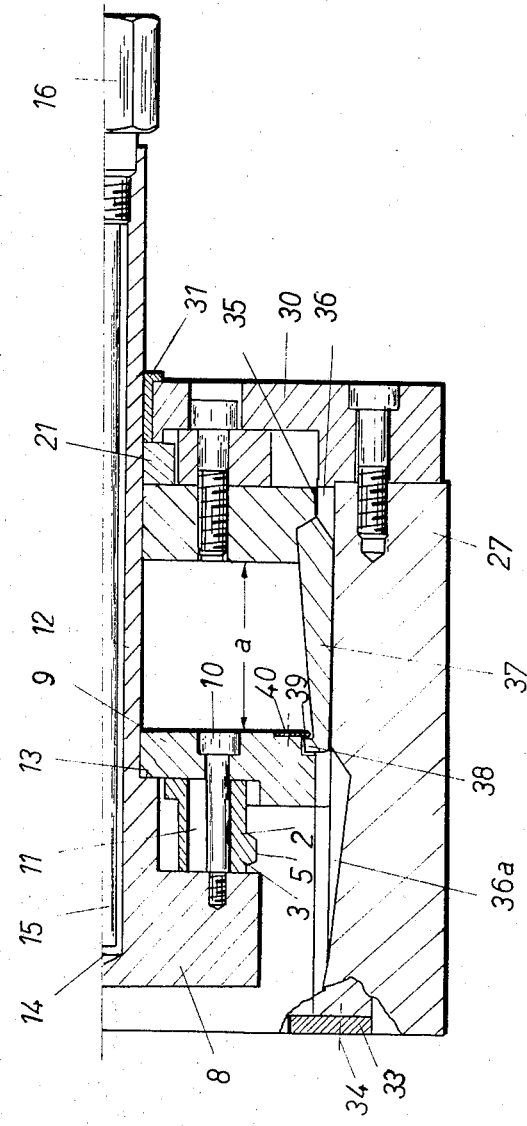
FIG. 4 is a view corresponding to that of FIG. 3 wherein the inner member of the apparatus is shown in its ejection position.

The disk 8 has an outer diameter which corresponds to the inner diameter of the finished tubing. Further, the disk 8 constitutes a head portion of an outrigger bolt 12 which has a square cross section as best seen in FIG. 2. The disk 8 may be rigidly connected to or form an integral part of the outrigger bolt 12. In order to avoid a clamping of the segments 3 and 4 between the disks 8 and 9 the outrigger bolt 12 is provided with a shoulder 13 against which the disk 9 rests as best seen in FIGS. 3 and 4. The outrigger bolt 12 is provided with a deep bore 14. A cooling pipe 15 extends into the bore 14 and is provided with a connecting nipple 16.

A supporting plate 17 is carried by the outrigger bolt 12 for axial displacement but secured against rotation. The plate 17 carries shifting wedges 18 which are provided with outrigger arms 19 extending at an angle relative to the longitudinal axis of the apparatus as best seen in FIG. 1. The outrigger arms 19 have a rectangular cross section and extend into respective holes 20 in the small segments 4. The support plate 17 is axially movable back and forth between the disk 9 and a set collar 21, whereby the outrigger arms 19 are adjustable between the two positions illustrated in FIG. 1. More specifically, the upper outrigger arm 19 in FIG. 1 is shown in its withdrawn or rightward position whereas the lower outrigger arm 19 in the lower half of FIG. 1 is shown to extend fully through the lower segment 4 so that the lower arm is in its leftward position. Due to this back and forth adjustment of the outrigger arms 19 the latter pull the wedge shaped segments 4 inwardly or they push these segments outwardly depending on the direction of adjustment. In order to assure a proper guiding of the support plate 17 guide bolts 22 are provided which at one end thereof are connected to the disk 9 as best seen at the upper lefthand corner of FIG. 1.

The support plate 17 is adjusted back and forth between the above outlined positions by means of additional guide bolts 23 which are connected to an intermediate plate 24 which in turn is secured to the plate 17. The free ends or rather the right hand ends of the guide bolts 23 are connected to a chucking plate 25 which in turn is driven by power means such as a hydraulic piston cylinder arrangement or any suitable source of power well known in the art and hence not shown. Although FIG. 1 illustrates simultaneously two different working positions, it will be appreciated that the arms 19 are moved in unison in actual operation.

It will be noted from FIG. 1 that the disk 8 with the outrigger bolt 12 constitute the supporting structure for the movable elements of the apparatus or device 1. In order to utilize these movable elements as an integral unit and in order to adapt the apparatus to the production of tubing having different cross section and different corrugation cross section, said integral unit is inserted into two half housing members 26 and 27 which are connectable to each other by means of screws 28 and 29. Further, there is provided a rear cover member 30 which facilitates the assembly of the unit and which could be formed as an integral portion of said housing half. The rear cover member 30 provides a bearing for the free end of the outrigger bolt 12 which is held in a bushing 31 which in turn is secured to the rear cover member 30. The rear cover member 30 is further provided with guide bushings 32 for the guide bolts 23. The front or left hand end of the device is closed by securing plates 33 which are releasably connected to the housing halves 26 and 27 by means of screws 34.

The housing halves 26, 27 are provided along their inner walls 35 with grooves 36 in which locking wedges 37 are received. These locking wedges or stop wedges 37 assure the spacing "a" between the disk 9 and the supporting plate 17 when the disk 8 and with it the outrigger bolt 12 are not in their end position for the injection molding step. Stated differently, the lock or stop wedges 37 assure that the segments cannot be extended prematurely before the inner movable elements of the entire apparatus are in their injection molding position. The stop wedges 37 reach with their hook shaped end 33 into a recess 39 in the disk 9. These recesses 39 are covered by a thin plate 40.

From FIG. 4 it is seen how the inner movable or shiftable portion of the apparatus 1 is withdrawn or moved back for the ejection of the finished tubing whereby the lock wedges 37 assure the above mentioned spacing "a" between the disk 9 and the support plate 17.

The just described apparatus operates as follows. Assuming that the elements of the apparatus are in the position illustrated in the lower half of FIG. 1, then, an outer forming member is shifted to extend over the disk 8 and over the bead 5 of the segments 3 and 4 until it touches the housing halfs 26 and 27. For simplicity's sake the outer molding member is not shown, but in practice it would be a tubular member having an inner diameter large enough to accommodate the disk 8 and to leave sufficient space for the wall thickness of the tubing to be produced by injection molding. Thus, when the outer member is in position the injection molding step may begin. After the tubing has hardened, the hydraulic or other drive means not shown withdraw the chuck plate 25 and with it the guide bolts 23 whereby the support plate 17 and thus the adjusting members 18 with their inclined outrigger arms 19 are also withdrawn. As a result, the segments 3 and 4 are pulled radially inwardly whereby they are brought into the position shown in the upper half of FIG. 1 or in FIG.

3. The drive means then continues to withdraw the guide bolts 23 whereby due to the set collar 21 on the one hand and due to the guide bolts 22 on the other hand the disk 8 as well as the outrigger bolt 12 and the disk 9 including all the elements arranged therebetween are withdrawn or rather are drawn into the apparatus so that the injection molded tubing will now be ejected. In response to this backward movement as just described, the locking wedge 37 is lifted out of its groove 36a and presses into the recess 41 of the support plate 17 whereby the spacing "a" between the plate 17 and the disk 9 are assured.

After the finished tubing is ejected the drive means advance the inner assembly of the entire apparatus forward or in the leftward direction. The plate 9 thus advances all the way to the stop plate 33 and at this instance the wedge 37 again moves back into its recessed groove 36a whereby the support plate 37 is released and the plate 9 is free to continue its leftward forward movement. As the support plate 17 now continues along the spacing "a" until it touches the disk 9 as seen in the lower half of FIG. 2, the segments 3 and 4 are moved outwardly by means of the pusher elements 18 or rather by their respective outrigger arm 19. Accordingly, the next injection molding steps can now be performed after the outer member has been shifted into its proper position around the disk 8 and in touch with the housing halfs 26 and 27. It will be appreciated that by means of the apparatus as just described it is possible to manufacture tubings of different shape as well as a wide range of corrugations having any desired size and shape.

Due to the acute angle shape of the outwardly pointing small segments 4 and due to the positive guide which is assured by the interengagement of the back tapered guide grooves in the small and large segments, the invention achieves the advantage that all segments are simultaneously subject to a positive guide whereby the segments are moved simultaneously radially outwardly or inwardly by means of the axial movement of the above described outrigger arms 19, which are slanted relative to the longitudinal axis of the apparatus.

Another advantage of the present apparatus is seen in that the shape of the circumferential bead 5 can be adapted to any desired shape or form of the respective corrugation which is positively molded by said bead 5. The most important advantage in this connection is seen in that the respective corrugation is directly and simultaneously formed with the injection molding of the tubing whereby the finished tubing after it has hardened may be easily removed from the apparatus because the bead 5 is withdrawn back into the free inner diameter of the tubing.

Moreover, the present apparatus assures the formation and position of the corrugation with high precision due to said positive drive of the individual segments 3 and 4. Thus, possible tolerances are minimized right at the start. It should be mentioned here that the relative size of the angles α and β to each other contribute to the positive drive as taught by the present invention.

Although the positive drive of the segments has been described above by way of example with reference to the axial movement of the outrigger arms 19, it will be appreciated that the positive simultaneous motion of the segments 3 and 4 can also be accomplished by means of wedges, bell cranks, cams, curve segments or similar elements which cooperate with respective surfaces of the segments 3 and 4 in response to rotation or axial movement of respective drive elements, whereby intermediate drive means may be employed in order to assure the cooperation of the segments. It will be appreciated that the elements required for the motion of adjustment of the segments 3 and 4 are relatively simple and thus their price is advantageous and their proper function is assured with certainty. Moreover, the arrangement is rather compact so that the moving elements do not have to traverse long distances whereby friction is minimized and the high efficiency for the transmittal of large forces by means of wedges or bell cranks or the like may be advantageously employed. Accordingly, even where the pressure employed for the injection molding step is rather high, the present apparatus will provide the necessary rigidity for the required counter pressure.

A still further advantage of the present invention is seen in the fact that the larger segments 3 also receive a positive guiding by the fact that they are held between the disks 8 and 9 and by the further fact that the longitudinal holes or apertures 11 provide a gliding movement back and forth on the bolts 10. A highly precise guiding is assured by the cooperation between the individual segments on the one hand and the disks 8 and 9 and the holes 11 and the screws 10 on the other hand, whereby tilting movements of the segments are positively avoided and locking of one segment relative to other segments is prevented. A further advantage of this positive guiding of the segments is seen in that the wear and tear is thereby reduced which in turn assures not only the proper function but also a substantial useful life of the present apparatus.

Another advantage of the invention is seen in that the entire structure is surprisingly simple, especially since the cooperating elements perform simultaneously several functions, for example the bolts 10 not only interconnect the disks 8 and 9 they simultaneously contribute to the positive guide of the large segments 3.

Although the invention has been described with reference to specific example embodiments, it is to be understood, that it is intended to cover all modifications and equivalents within the scope of the appended claims.

What is claimed is:

1. In an apparatus for producing tubing from injection molding material which tubing is provided in its wall with an outwardly directed corrugation produced simultaneously with the injection molding step by means of a forming ring having alternating large and small radially displaceable individual segments which are withdrawn upon the completion of the injection molding steps inwardly toward the longitudinal axis of the apparatus, radially outer surfaces of said segments defining the inner diameter of the tubing to be molded; the improvement comprising guide means along all the flanks of the large and small segments facing each other and intercoupling said small and large segments whereby radial displacement of said small segments effects radial displacement of said large segments in the same direction and positive drive means operatively connected to said small segments, said drive means extending at an angle relative to said longitudinal axis of the apparatus, and comprising outrigger arms for radially moving said small segments, said outrigger arms extending at an angle relative to the longitudinal axis of the apparatus, said small segments having outwardly extending flanks forming an acute angle (β), said guide means comprising tapered slide guide means on said outwardly extending flanks, said large segments also having flanks with tapered slide guide means for cooperation with said guide means of the small segments, said flanks of the large segment having an included angle (α) which is larger than the respective angle (β) of the small segments whereby all segments are included in a positive guide for their simultaneous movement radially inwardly and outwardly, a first and second disk, said segments being arranged between said disks, one of said disks having an outer diameter corresponding to the inner diameter of the tubing to be molded, collar bolts for interconnecting said disks and shoulder means for assuring a definite spacing between said disks for assuring a gliding movement of said segments between the disks, said large segments having longitudinal, radially extending apertures through which said collar bolts extend to permit a gliding movement of the segments relative to the respective collar bolt, and relative to said disks, whereby a positive driving force in the radial direction is applied to said small segment prior to the radial withdrawal of said outer surfaces which define the inner diameter of the tubing to be molded.

2. The apparatus according to claim 1, further comprising means coupled to said drive means for holding the driven segments in their outer ring forming position.

3. The apparatus according to claim 1, in which said small segments have drive surfaces, further comprising means for the movement of the individual segments which in response to movement of said drive means engage respective drive surfaces of the segments to drive the respective segments in the required segment movement direction.

4. The apparatus according to claim 1, further comprising a support plate for supporting said outrigger arms, means for axially moving said plate, said outrigger arms slanting from said plate toward said longitudinal axis of the apparatus, said outrigger arms having a square cross section, said small segments having respective apertures through which the outrigger arms extend for gliding movement.

5. The apparatus according to claim 4, further comprising guide bolts secured to said support plate on a side opposite said outrigger arms, a chucking plate and means for connecting said guide bolts at its free end to said chucking plate and means operatively connected to said chucking plate for moving said outrigger arms back and forth.

6. The apparatus according to claim 4, further comprising an outrigger bolt forming an extension of one of said disks, said outrigger bolt extending rearwardly, said support plate being arranged on said outrigger bolt for axial movement therealong, means for securing said one disk against rotational movement and stop means along said outrigger bolt for limiting the axial movement of said support plate.

7. The apparatus according to claim 6, wherein the stop means for said support plate is formed on the one hand by said second disk and on the other hand by means of a set collar on the outrigger bolt as well as by collar bolts screwed into said second disk.

8. The apparatus according to claim 6, further comprising housing halfs having along their inner wall surface longitudinally extending grooves and locking wedge means arranged in said grooves for cooperation with said support plate.

9. The apparatus according to claim 6, wherein said outrigger bolt forms an extension of said one guide disk and is hollow along its entire length, comprising cooling means arranged in said hollow outrigger bolt.

10. The apparatus of claim 1, wherein said small segments each have a hole extending therethrough, at an angle to said axis corresponding to the angle between said outrigger arms and the axis of said apparatus, said holes in said small segments corresponding in cross section to the cross section of said outrigger arms, said arms extending through said holes whereby said small segments are moved in a radial direction upon movement of said arms in the axial direction of said apparatus, and said outrigger arms hold said small segments in a radial position dependent upon the axial position of said outrigger arms.

* * * * *